Nov. 12, 1935.  B. D. McINTYRE  2,020,899
STABILIZING MEANS FOR VEHICLES
Filed Dec. 4, 1934  2 Sheets-Sheet 1

INVENTOR
BROUWER D. McINTYRE
BY
ATTORNEYS

Nov. 12, 1935.    B. D. McINTYRE    2,020,899
STABILIZING MEANS FOR VEHICLES
Filed Dec. 4, 1934    2 Sheets-Sheet 2
FIG.3.
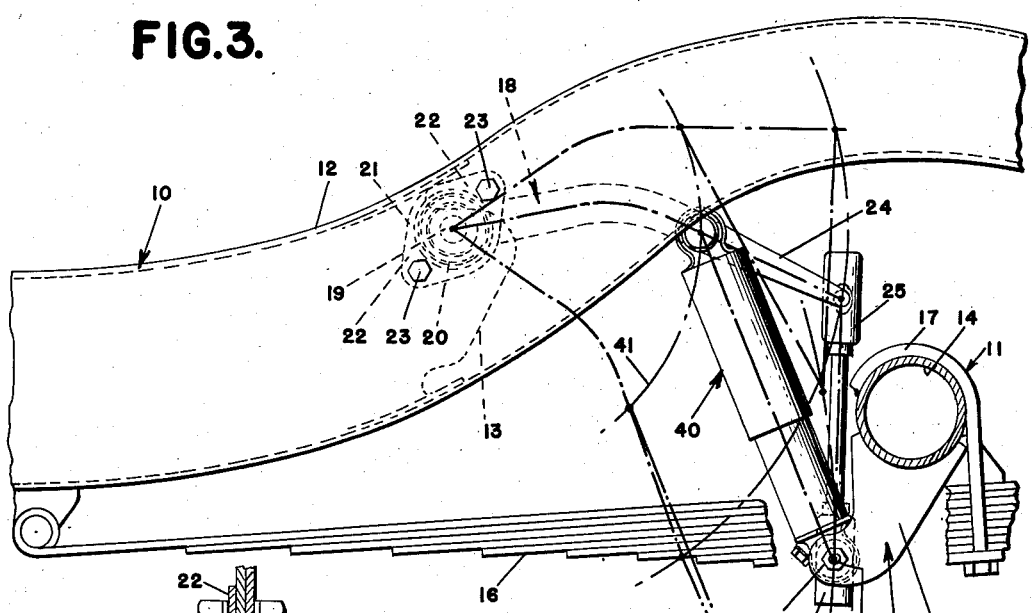
FIG.5.
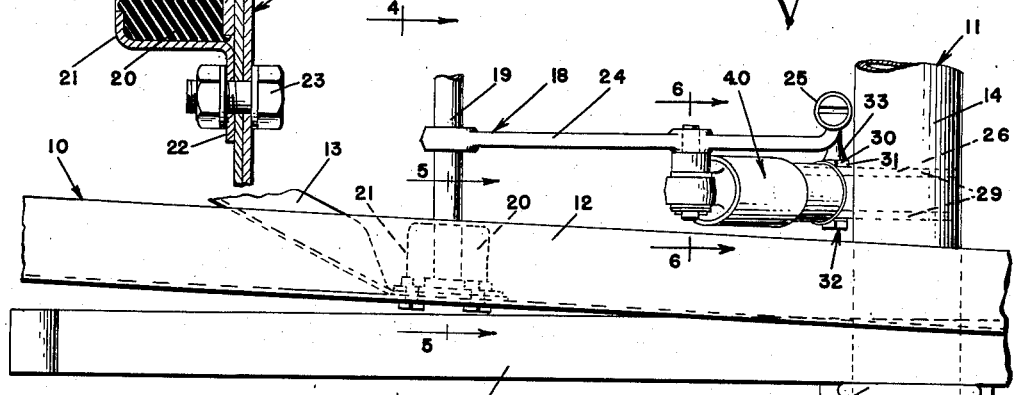
FIG.2.
FIG.6.
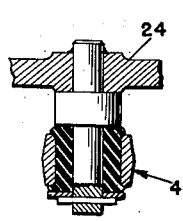
INVENTOR
BROUWER D. McINTYRE
BY
ATTORNEYS Patented Nov. 12, 1935

2,020,899

UNITED STATES PATENT OFFICE 2,020,899

STABILIZING MEANS FOR VEHICLES

Brouwer D. McIntyre, Monroe, Mich., assignor to Monroe Auto Equipment Company, Monroe, Mich., a corporation of Michigan Application December 4, 1934, Serial No. 755,965

6 Claims. (Cl. 267—11)

This invention relates generally to vehicle chassis constructions and refers more particularly to improvements in chassis equipped with stabilizing means of the type permitting a relative movement between the sprung and unsprung weight on one side of the chassis to be transmitted to a substantially equal relative movement between the corresponding parts on the other side of the vehicle.

The present invention contemplates improving generally, vehicle chassis equipped with stabilizing means of the character set forth, and concerns itself more particularly with an improved shock absorber installation for such chassis.

The foregoing will be made more apparent as this description proceeds, especially when considered in connection with the accompanying drawings, wherein:

Figure 2 is an enlarged plan view of a portion of the chassis shown in Figure 1;

Figure 3 is a fragmentary side elevational view of the construction shown in Figure 2;

Figure 7:
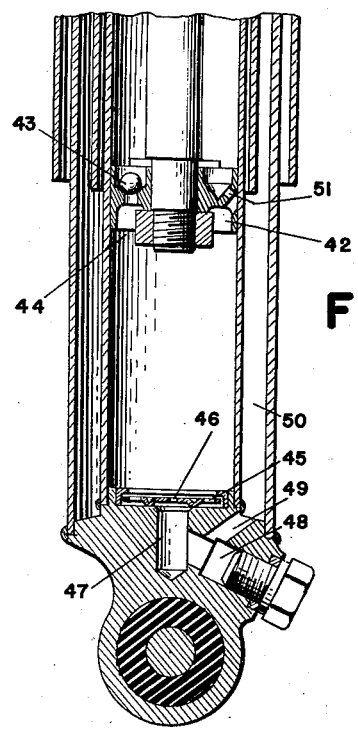
Figure 4:
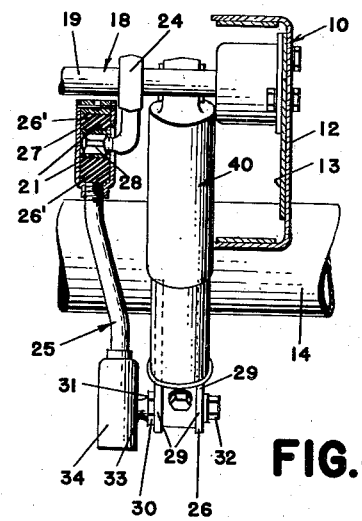

Figures 4, 5, and 6 are sectional views taken respectively on the lines 4—4, 5—5 and 6—6 of Figure 2; and Figure 7 is an enlarged fragmentary longitudinal sectional view through the shock absorber shown in Figure 4.

Figure 1:
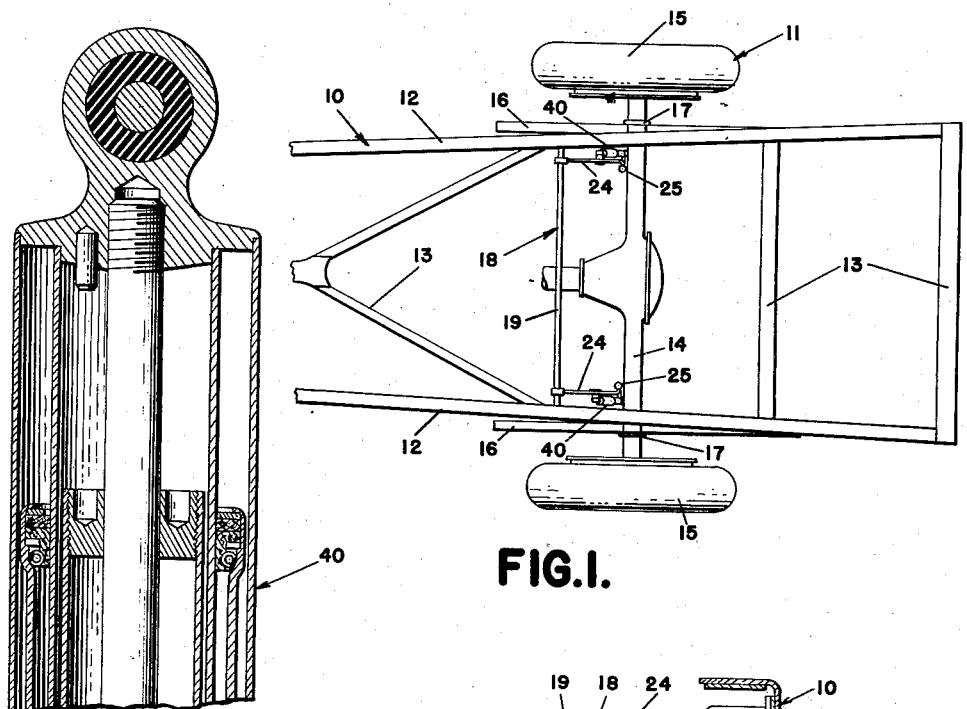
Figure 1 is a fragmentary plan view of a vehicle chassis constructed in accordance with this invention.

Referring now to the drawings, it will be noted that there is illustrated in Figure 1 a portion of a vehicle chassis having a sprung assembly 10 and having an unsprung assembly 11. The sprung assembly 10 comprises a frame 12 having laterally spaced longitudinally extending side sills secured in assembled relation to each other by suitable cross members designated generally herein by the reference character 13. The unsprung assembly 11 comprises an axle 14 extending transversely of the frame 12 beneath the latter and carrying road engaging wheels 15 at opposite ends thereof. In the present instance, the sprung assembly 10 is supported from the unsprung assembly 11 by means of semi-elliptical leaf springs 16 extending longitudinally of the frame 12 at opposite sides thereof and having the free end portions suitably connected to the adjacent sill members of the frame. As shown particularly in Figure 3, the central portions of the leaf springs are secured to the axle 14 by suitable U-bolts 17.

In order to prevent side-sway of the sprung weight, or in other words in order to maintain the normal plane of the frame substantially parallel with the plane of the axle when the vehicle is turned either to the right or to the left, it has been proposed to provide means for transmitting the relative movements between the sprung and unsprung weights on one side of the vehicle to similar movements between these parts on the opposite side. In the present instance, the foregoing is accomplished by a stabilizer 18 comprising a torsion bar 19 extending transversely of the frame and having the opposite ends rockably mounted upon the side sills 12 of the frame. In accordance with this invention the free ends of the bar 18 are embedded in rubber blocks 20 secured under compression within suitable cup-shaped containers 21 having marginal flanges 22 secured to the side sills through the medium of fastener elements 23. Each end of the bar 19 is operatively connected to the corresponding end portion of the axle 14 in such a manner that relative movement between the axle and frame at one side of the vehicle will be transmitted through the torsion bar tending to effect a similar relative movement between these parts on the opposite side of the vehicle. The operative connections between the torsion bar 19 and the axle 14 comprise arms 24 secured at the forward ends to the torsion bar and at the rear ends to the upper extremities of suitable links 25 having the lower extremities connected to the axle 14 through the medium of suitable brackets 26. As shown in Figure 4, the upper ends of the links 25 are provided with sockets 27 having apertures or openings through the side walls thereof for receiving suitable pins 28 extending laterally from the rear ends of the arms 24. In detail, a pair of blocks of compressible material 26' are arranged in each of the sockets 27 on opposite sides of the pins 28 extending into the sockets and are opposed to the flat sides 27' of the pins 28. This type of connection is not essential, but is preferred and is defined in detail in the John M. Nickelsen Patent No. 1,845,095, issued February 16, 1932. Irrespective of the particular type of connection employed the arrangement is preferably such as to permit restricted universal movement between the upper ends of the links 25 and the rear ends of the arms 24.

As also shown in Figure 4, each of the brackets 26 is formed of laterally spaced plates 29 secured to the axle 14 and depending therefrom. The lower extremities of the plates 29 are provided with aligned openings therethrough for receiving bolts 30 having headed portions 31 engaging the innermost plates of the brackets and having nuts 32 threaded upon the outer ends thereof for securing the same to the brackets. The heads 31 are provided with inwardly projecting extensions 33 extending into sockets 34 carried by the lower ends of the links 25 and serving to pivotally connect the latter ends of the links to the brackets 29 in the same manner as the upper ends of the links 25 are connected to the arms 24.

With the construction previously described, it will be noted that as the vehicle is turned in one direction, to the left for example, the centrifugal force set up by the curve causes a tendency of the sprung weight to lean over to the right, resulting in a compression of the spring 16 on the right-hand side of the vehicle, and thereby effecting relative movement of the corresponding end of the axle and adjacent sill member of the frame toward each other. Upon relative movement of the end of the axle and sill member of the frame at the right-hand side of the vehicle toward each other, the right-hand link 25 will exert a force upon the rear end of the corresponding arm 24 moving the arm upwardly and thereby rocking the torsion bar 19 in a counter-clockwise direction (as viewed in Figure 3). Rocking movement of the torsion bar in the aforesaid direction effects an upward movement of the rear end of the arm 24 on the left-hand side of the vehicle to exert an upward force upon the corresponding link 25. As a result, the left-hand side of the vehicle frame will be moved downwardly, compressing the left-hand spring 16 to substantially the same degree as the right-hand spring 16 was compressed by the centrifugal force effected by turning the vehicle to the left. Thus it will be readily apparent that irrespective of the direction of turning movement of the vehicle, the normal plane of the frame and the normal plane of the axle will always be maintained parallel to one another, and this is important since it eliminates side-sway.

In accordance with the present invention, the operation of the springs 16 is controlled by double acting shock absorbers of the tubular type, and one of the principal features of this invention resides in the novel manner in which these shock absorbers are incorporated in the assembly. In general, a shock absorber 40 is associated with each side of the vehicle and in the present instance the upper ends of the shock absorbers are pivotally connected to the arms 24 intermediate the ends thereof. The lower ends of the shock absorbers are pivotally mounted upon the bolts 30 between the plates 29 of the brackets 26 in the manner clearly shown in Figure 4. Inasmuch as the arms 24 form a part of the sprung assembly of the vehicle, and the upper ends of the shock absorbers are connected to these arms, the operation of the shock absorbers to control the action of the springs 16 will be the same as in the conventional installation and will be briefly discussed in the following description. However, by pivotally supporting the upper ends of the shock absorbers upon the arms 24 intermediate the ends of the latter, the length of the shock absorbers may be appreciably reduced, due to the fact that the upper ends of the shock absorbers are permitted to move throughout the arcs 41 upon deflection of the springs 16.

Although various different types of tubular shock absorbers may be successfully employed in the above combination for controlling the action of the springs 16, nevertheless, I prefer the construction selected in the drawings for illustration. The particular construction of this type of shock absorber is shown and described in detail in the John M. Nickelsen Patent No. 2,004,380, Jan. 11, 1935. In view of the complete description of this type of shock absorber in the above identified Nickelsen patent, it is believed that the following description of the operation of the shock absorbers is sufficient for the present disclosure.

As will be observed from Figure 7, when the piston 42 travels downwardly the pressure of the fluid below the piston unseats the check valve 43 and the oil is permitted to flow freely from the lower end of the pressure side 44 toward the upper end thereof. During this movement, the flapper valve 45 seats, and any excess oil in the lower end of the pressure cylinder escapes through the small orifice 46 through the passages 47, 48, and 49 to the reserve reservoir 50. On the return movement, or in other words when the piston 42 is moved upwardly, the check valve 43 seats, and the oil can pass from the upper end of the pressure cylinder 44 through the piston 42 to the lower end of the pressure cylinder only through the relatively restricted orifice 51. This orifice is of such a size as to give the desired amount of resistance suitable for the particular shock absorber unit in question, and of course can be varied in size in accordance with the desired operation of the shock absorber. Thus the upward movement of the piston is retarded in dependence upon the size of the orifice, and during this upward movement of the piston the flapper valve 45 is raised from its seat so that the oil may flow freely from the reservoir 50 through the passages 49, 48, and 47 and into the lower end of the pressure cylinder 44.

What I claim as my invention is:

1. In a vehicle having sprung and unsprung assemblies movable vertically relative to each other, stabilizing mechanism comprising a cross shaft rockably mounted upon one of the assemblies, an arm fixed to the cross shaft and extending laterally therefrom, means connecting the free end portion of the arm to the other assembly, and shock absorbing means between the two assemblies comprising relatively movable parts having the opposite ends respectively connected to the last named assembly and to the arm at a point spaced from the connection of the latter to the cross shaft.

2. In a vehicle having sprung and unsprung assemblies movable vertically relative to each other, stabilizing mechanism comprising a cross shaft mounted upon the sprung assembly to turn, an arm fixed to each end portion of the shaft and extending laterally therefrom, means connecting the free ends of the arms to the unsprung assembly, and shock absorbing means associated with opposite sides of the assemblies and comprising relatively movable parts having the upper ends pivotally connected to the arms at points spaced from the connection of the arms with the cross shaft and having the lower ends connected to the unsprung assembly.

3. In a vehicle having sprung and unsprung assemblies movable vertically relative to each other, stabilizing mechanism between the assemblies comprising a shaft mounted upon one of the assemblies to turn and having an arm extending laterally therefrom, means connecting the free end of the arm to the other assembly, and shock absorbing means between the assemblies comprising relatively movable parts respectively connected to the arm intermediate the ends of the latter and to the other assembly.

4. In a vehicle having sprung and unsprung assemblies movable vertically relative to each other, stabilizing mechanism between the assemblies comprising a shaft mounted upon one of the assemblies to turn and having an arm extending laterally therefrom, means connecting the free end of the arm to the other assembly, and shock absorbing means between the assemblies comprising a fluid cylinder and a piston reciprocably mounted in the cylinder, one of the latter members having a portion connected to the arm intermediate the ends of the latter and the other of said members having a portion connected to the other assembly.

5. In a vehicle having a frame and having a pair of oppositely disposed wheels suspended beneath the frame, stabilizing mechanism comprising shaft means rockably carried by the frame and having laterally extending arms operatively connected to the wheels, and a shock absorber associated with each wheel and having telescopically engaging parts, the upper parts being pivotally connected to the arms intermediate the ends thereof and the lower parts being operatively connected to the wheels.

6. In a vehicle having a sprung assembly and an unsprung assembly, stabilizing mechanism comprising a cross shaft mounted on the sprung assembly, a bracket supported upon the unsprung assembly at each side of the latter having laterally spaced portions provided with aligned openings therethrough, a pin extending through the aligned openings in the laterally spaced portions of each bracket and having an extension projecting laterally from the bracket, an articulated connection between opposite ends of the cross shaft and extensions of the pins and shock absorbing means between the sprung and unsprung assemblies on opposite sides thereof comprising relatively movable parts, the lower parts of the shock absorber means being pivotally mounted upon the pins between the laterally spaced portions of the brackets and the upper parts of the shock absorber means being operatively connected to the sprung assembly.

BROUWER D. McINTYRE.